(12) United States Patent
Pickartz et al.

(10) Patent No.: US 9,415,696 B2
(45) Date of Patent: Aug. 16, 2016

(54) RADIATOR GUARD FOR A VEHICLE AND VEHICLE HAVING SUCH A RADIATOR GUARD

(71) Applicant: Volkswagen Aktiengesellschaft, Wolfsburg (DE)

(72) Inventors: Thomas Pickartz, Braunschweig (DE); Hergen Grimm, Lehre (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/581,526

(22) Filed: Dec. 23, 2014

(65) Prior Publication Data

US 2015/0102627 A1    Apr. 16, 2015

Related U.S. Application Data

(63) Continuation of application No. PCT/EP2013/000793, filed on Mar. 15, 2013.

(30) Foreign Application Priority Data

Jun. 23, 2012    (DE) .......................... 10 2012 012 658

(51) Int. Cl.
*B60K 15/05* (2006.01)
*B60L 11/18* (2006.01)
*B60K 1/00* (2006.01)
*B60L 11/14* (2006.01)
*B60R 19/52* (2006.01)

(52) U.S. Cl.
CPC .............. *B60L 11/1818* (2013.01); *B60K 1/00* (2013.01); *B60K 15/05* (2013.01); *B60L 11/14* (2013.01); *B60R 19/52* (2013.01); *B60K 2015/0507* (2013.01); *B60L 2240/36* (2013.01); *B60L 2270/32* (2013.01); *B60L 2270/34* (2013.01); *B60R 2019/525* (2013.01); *Y02T 10/70* (2013.01); *Y02T 10/7005* (2013.01); *Y02T 10/7072* (2013.01); *Y02T 10/7077* (2013.01); *Y02T 90/14* (2013.01)

(58) Field of Classification Search
CPC ........................................................ B60K 15/05
USPC ....................................................... 296/97.22
See application file for complete search history.

(56) References Cited

U.S. PATENT DOCUMENTS

| | | | |
|---|---|---|---|
| 5,919,048 A | 7/1999 | Slattery | |
| 6,921,492 B2 * | 7/2005 | De Gaillard | ............... 296/26.07 |
| 7,658,438 B1 * | 2/2010 | Elliott | ................. E05D 15/1081 296/155 |

FOREIGN PATENT DOCUMENTS

| | | |
|---|---|---|
| DE | 33 07 812 A1 | 5/1984 |
| DE | 195 46 085 C1 | 6/1997 |
| DE | 198 33 465 A1 | 2/2000 |

(Continued)

*Primary Examiner* — H Gutman
(74) *Attorney, Agent, or Firm* — Muncy, Geissler, Olds & Lowe, P.C.

(57) ABSTRACT

A radiator guard for a vehicle, particularly a motor vehicle, which is arranged on the front end of the vehicle and covers one or a plurality of units and/or devices arranged in the engine compartment of the vehicle. The radiator guard is formed advantageously in multiple parts, wherein to avoid an opening in the visible region thereof at least one part of the radiator guard is designed so as to be adjustable relative to the other part(s), thus allowing access to at least one of said units and/or devices.

15 Claims, 5 Drawing Sheets

(56) References Cited

FOREIGN PATENT DOCUMENTS

| | | |
|---|---|---|
| DE | 10 2010 026 268 A1 | 3/2011 |
| FR | 2 852 564 A1 | 9/2004 |
| FR | 2 909 363 A3 | 6/2008 |
| JP | H 01-122328 A | 5/1989 |
| JP | H 07-122328 A | 5/1995 |
| WO | WO 2010/143040 A1 | 12/2010 |

* cited by examiner

RADIATOR GUARD FOR A VEHICLE AND VEHICLE HAVING SUCH A RADIATOR GUARD

This nonprovisional application is a continuation of International Application No. PCT/EP2013/000793, which was filed on Mar. 15, 2013, and which claims priority to German Patent Application No. 10 2012 012 658.1, which was filed in Germany on Jun. 23, 2012, and which are both herein incorporated by reference.

BACKGROUND OF THE INVENTION

1. Field of the Invention

The present invention relates to a radiator guard for a vehicle, particularly a motor vehicle, and to a vehicle having a radiator guard.

2. Description of the Background Art

A radiator guard, mainly in the form of a radiator guard grille, is typically arranged on the front end of a vehicle and has one or more horizontal and/or vertical bars, which enable the passing of a cooling air stream to units or other devices arranged within the engine compartment. Moreover, the radiator guard grille because of its impression or the quality of its design quite often represents a part that is characteristic for the vehicle. The striking impact of the radiator guard grille in this regard can even go so far that the particular vehicle or the vehicle manufacturer can already be identified from the radiator guard grille by the relevant public or customers. In the recent past, because of the steadily decreasing supply of fuels for the combustion engine-powered drive of motor vehicles, great efforts have been made to provide alternative types of drives.

Electric engine or hybrid drives have become increasingly important, whereby driving power is provided in the form of electrical energy by means of electrical storage elements, such as batteries or accumulators. To supply batteries with electrical energy, external charging stations are preferably provided, which for their part can be connected to the vehicle's battery by means of a charging cable. In this respect, the vehicle has a charging socket associated with a corresponding charging plug of the charging station. The charging socket is placed, for example, in an ergonomically favorable manner in the area of the front end of the vehicle.

In view of an external supplying of the battery or accumulator with electrical current, DE 33 07 812 A1 discloses a charging socket disposed directly behind the radiator guard grille of the vehicle. The access to the charging socket is enabled via an opening in the radiator guard, in the present case in the radiator guard grille, whereby said opening can be closed by a separate, removable cover. It can be regarded as disadvantageous in this case that a possible striking impression of the conventional radiator guard, i.e., without the opening together with the cover, is at least spoiled by this fixture or fitting. Thus there is the need to maintain the striking design of the radiator guard in the possible extensions of its functions as well.

JP 7122328 A describes a charging socket that is arranged on the front end of a vehicle and is covered by an emblem arranged centrally on a radiator guard grille. The emblem is mounted rotatable around a defined pivot point and swings from a closed position where it covers the charging socket to an opened position where it releases the access to the charging socket. The size of the opening arranged behind the emblem for access to the charging socket is thereby determined by the emblem and is accordingly very limited.

SUMMARY OF THE INVENTION

It is therefore an object of the present invention to provide a radiator guard that represents an alternative to the prior art, which while retaining its striking effect, i.e., without any additional elements detracting from said striking effect, is an expansion of its function, particularly with respect to the arrangement of a unit or/or other device on the engine compartment side of the radiator guard, and situationally enables access to the unit and/or other device. According to another aspect of the invention, a vehicle is furthermore provided with such a radiator guard.

Proceeding from a radiator guard for a vehicle, particularly a motor vehicle that is arranged on the front end of the vehicle and covers one or more units and/or devices arranged in the engine compartment of the vehicle, the stated object is achieved in an embodiment in that the radiator guard is configured in multiple parts and by avoiding an opening in the visible area thereof at least one part of the radiator guard is designed so as to be adjustable relative to the other part(s), thus enabling access to at least one of the said units and/or devices.

An access opening, favored in the prior art and closable as well with a flap, in the radiator guard associated with possible design-determining features is advantageously avoided by this measure, because in the present case the radiator guard itself or a part thereof is designed as adjustable and enables front-side access to said units and/or devices. In other words, the design-determining features of the radiator guard despite enabling the front-side access to at least one unit and/or at least one device, arranged in the engine compartment, are not negatively affected in their effect.

An embodiment of the radiator guard provides a support part, which supports at least one first cover part, fixedly arranged on the support part, and at least one second cover part relatively adjustable to it. According to an embodiment of the invention, the cover parts if required in a specific, preselected design and arrangement have one or more bars, particularly horizontal and/or vertical bars, as a result of which the passing of a cooling air stream through the radiator guard in the form of a so-called radiator guard grille into the engine compartment is enabled. Depending on the arrangement of the units and/or devices to which access is to be enabled, and/or on the selected design of the radiator guard, the cover parts are arranged one behind the other when viewed in the transverse vehicle direction (Y-direction) or one above the other when viewed in the vertical vehicle direction (Z-direction). As the invention provides further, the at least one adjustable second cover part in a first operating position (normal position) with the at least one first cover part, fixedly arranged on the support part, forms an aligned visible side of the radiator guard, as a result of which the striking impression of the radiator guard is retained especially well. As the invention provides further, the at least one adjustable second cover part in a second operating position (open position) is arranged in a plane that is arranged parallel, virtually parallel, or at an angle to the plane of the normal position. In this respect, according to the invention an adjustment of the second cover part relative to the at least one first cover part, fixedly arranged on the support part, is provided or enabled by sliding and/or pivoting. In a refinement of the invention, it is provided further that the at least one adjustable second cover part forms at least proportionally a joint to one or more adjacent parts of the vehicle. This has the advantage of the especially effective concealment of the multiple part nature of the radiator guard. The at least one adjustable second cover part is arranged especially advantageously in an area of the radiator guard that covers a media connecting device arranged on the engine compartment side, particularly a charging socket for supplying an electrical storage device, such as a battery, with electrical current. A convenient front-side access to said media connecting device, particularly a charging socket, is made possible by this measure.

The invention also relates to a vehicle, particularly a motor vehicle, having a radiator guard of the aforementioned type.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
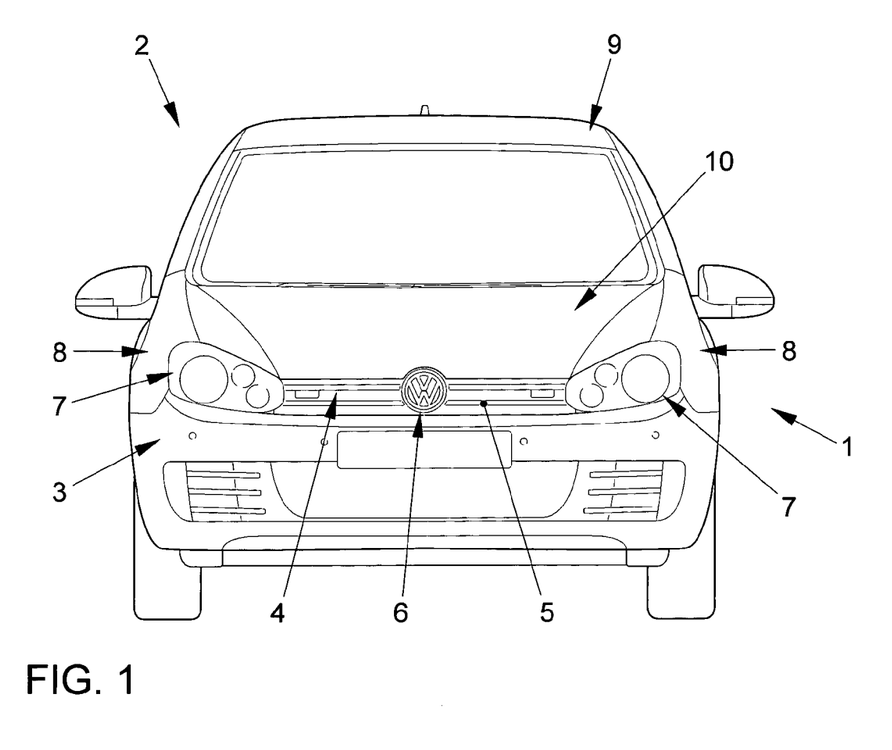
FIG. 1 shows the front view of the front end of a vehicle, equipped with a radiator guard, according to a first embodiment.

FIG. 1 shows first front end 1 of a vehicle 2, in the present case a passenger vehicle, with a bumper 3, with a radiator guard 4 in the form of a radiator guard grille provided with bars 5, in the present case with horizontal bars, and an emblem 6, with headlights 7 arranged to the side of radiator guard 4, with front fenders 8, which connect toward the vehicle rear to passenger compartment 9 of vehicle 1, and with a hood 10. Said radiator guard grille enables the passing of a cooling air stream into a hollow space closed from above by hood 10, e.g., the engine compartment of vehicle 2, in which, for example, an internal combustion engine (not shown in greater detail) as the drive unit and an electric engine of a hybrid drive of vehicle 2 are placed.

Figure 3:
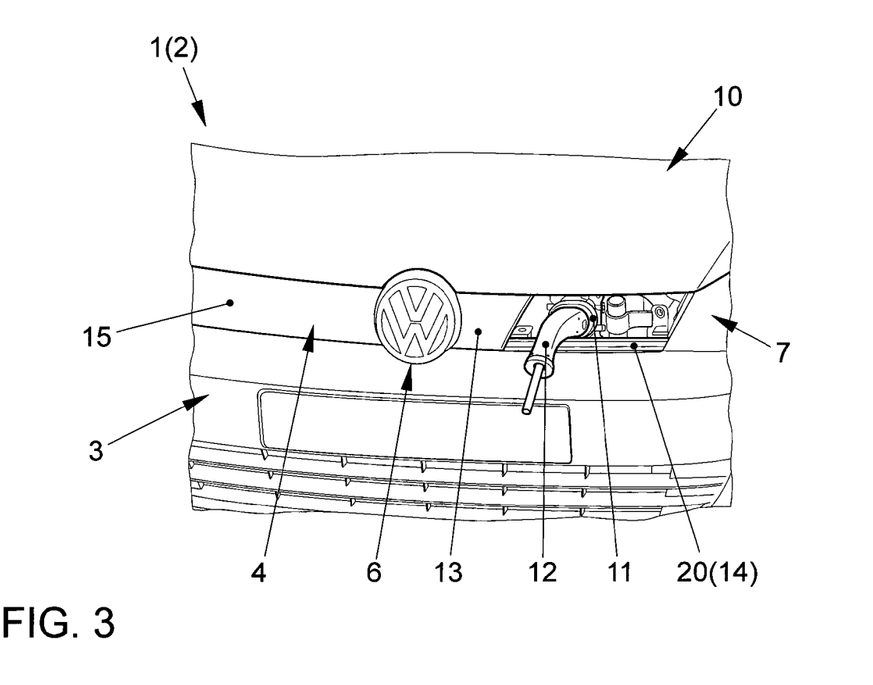
FIG. 3 shows a first design variant of the radiator guard according to FIG. 2 with a cover part, adjustable according to the invention, in its open position.
Figure 10:
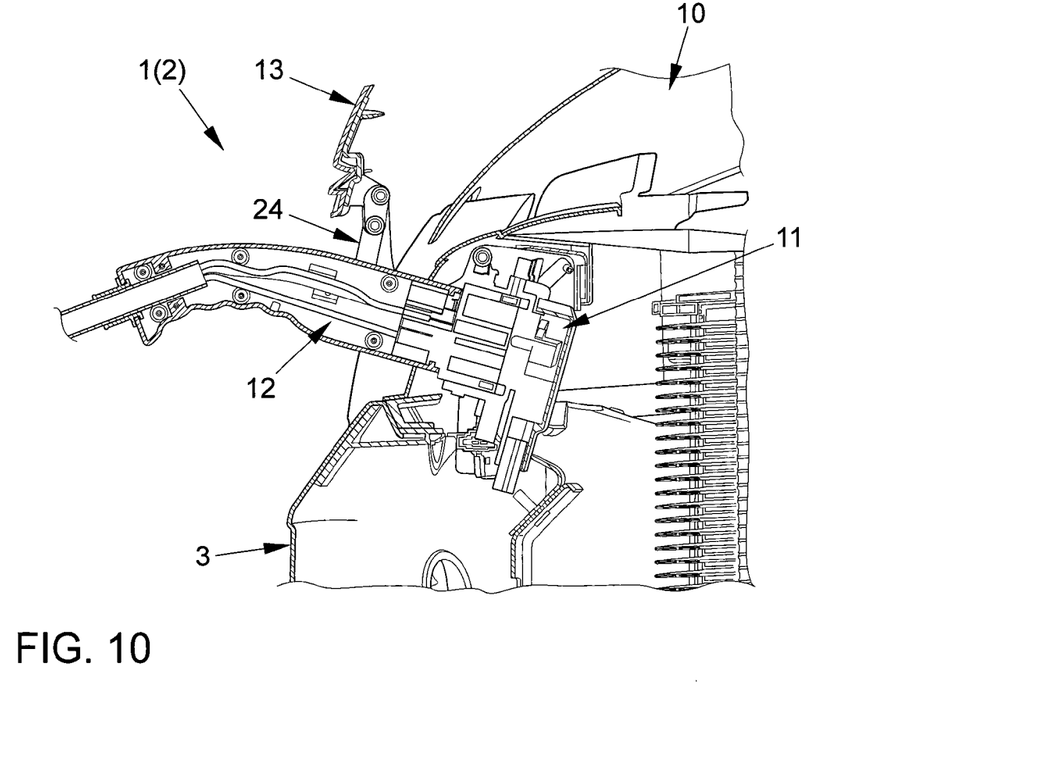
FIG. 10 shows a front end of the vehicle in the longitudinal section with an opened cover part and a charging socket to which a charging plug is connected.

Radiator guard 4 or the radiator guard grille accordingly covers the hollow space/engine compartment on the front of vehicle 2 and aggregates and/or other devices arranged on the engine compartment side of the radiator guard grille, for example, also a media connecting device in the form of a charging socket 11 for supplying an electrical storage device (not shown in the drawing), such as a battery, with electrical current. A charging plug 12, which for its part is connected electrically to a preferably external charging station (not shown in the drawing) (cf. FIGS. 3 and 10), is or can be connected to said charging socket 11.

Figure 2:
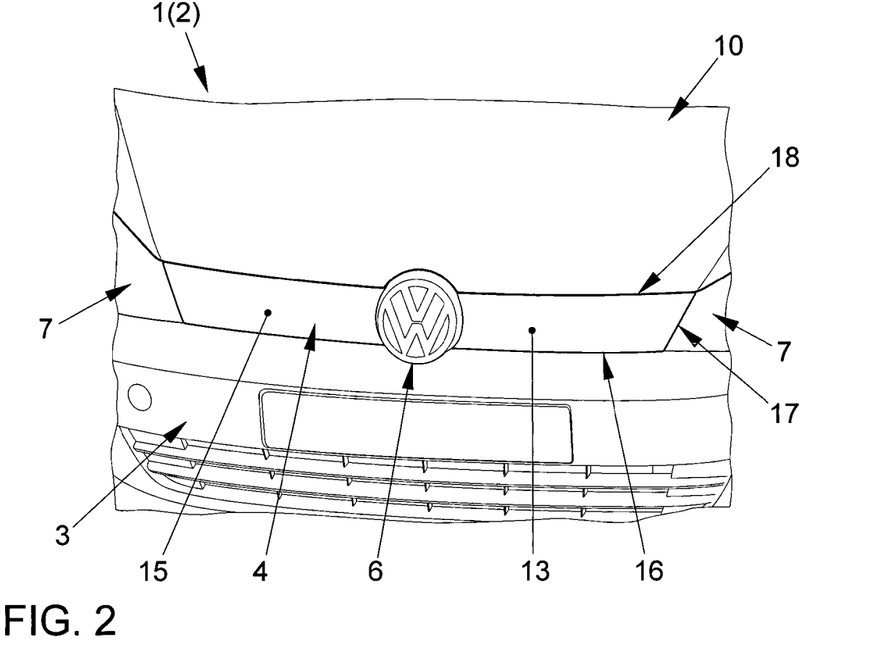
FIG. 2 shows the front end with a radiator guard according to a further embodiment.

If vehicle 2 is an exclusively electrically powered vehicle 2, as shown in FIG. 2, optionally a cooling air passage through radiator guard 4 and accordingly said bars 5 may be unnecessary.

As can be gathered further from the figures in the drawing, radiator guard 4 is made of multiple parts, namely, such that to avoid an opening favored according to the prior art (DE 33 07 812 A1) in the visible area of radiator guard 4, at least one part 13 of radiator guard 4 is configured so as to be adjustable relative to other parts 14, 15 thereof, thus enabling access to one of the said units and/or devices, in the present case particularly to charging socket 11.

Figure 4:
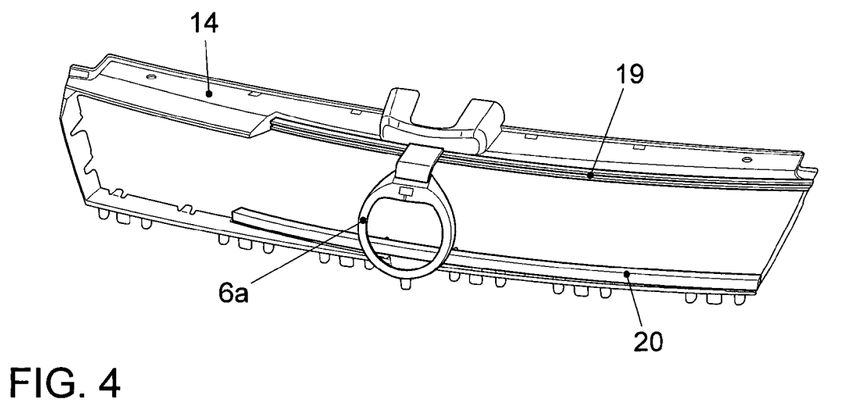
FIG. 4 shows a perspective view of a frame-shaped support part of the radiator guard according to FIG. 2 in isolation.
Figure 5:
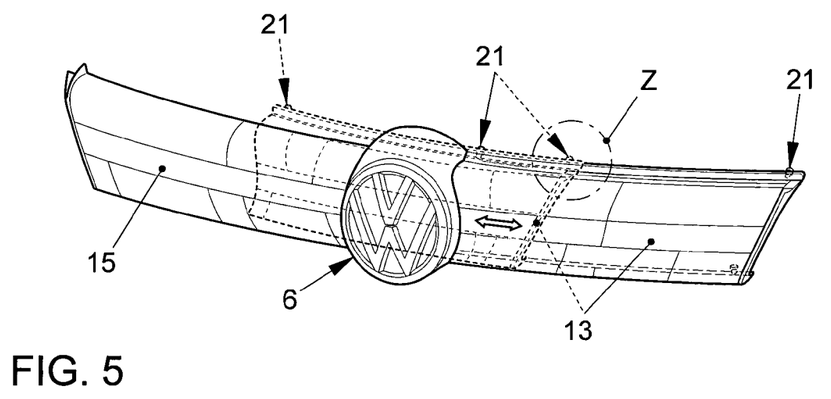
FIG. 5 shows a first cover part, fixedly attachable to the frame-shaped support part (not shown in greater detail for better clarity) and an adjustable cover part, which for its part is shown both in a normal position or closed position (solid lines) and also in an open position (dashed lines)
Figure 6:
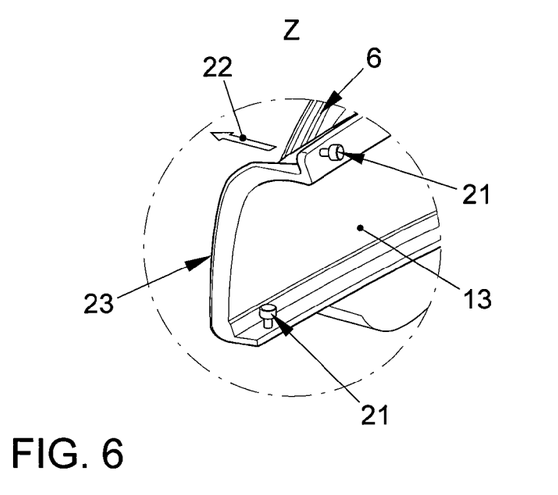
FIG. 6 shows a detail "Z" according to FIG. 5 (perspective side view)
Figure 7:
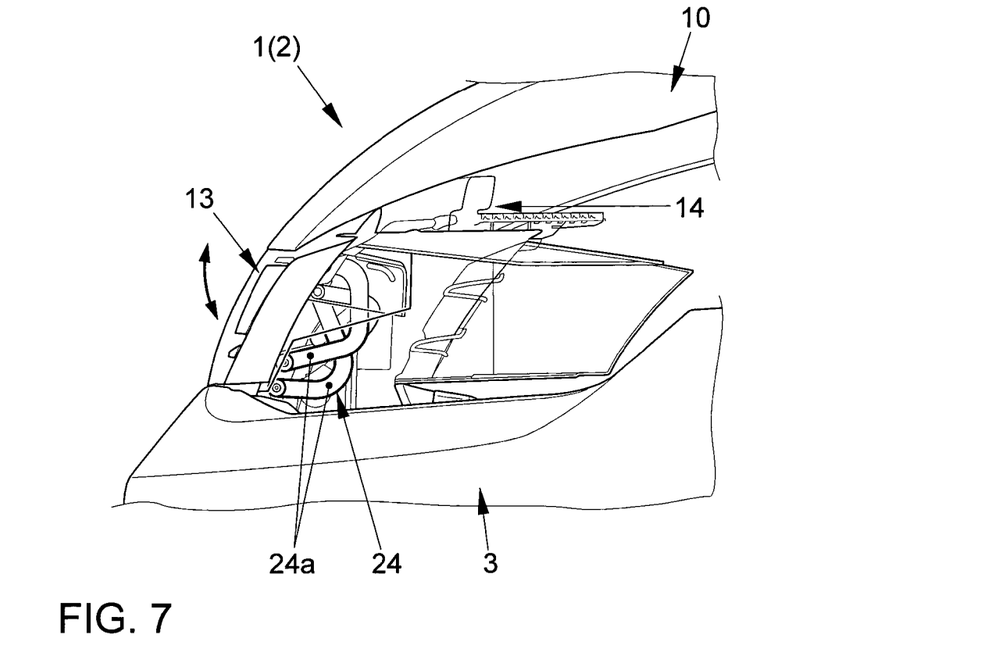
FIG. 7 shows a side view of a second design variant of the radiator guard according to FIG. 2 with an adjustable cover part according to the invention in a closed position thereof.
Figure 8:
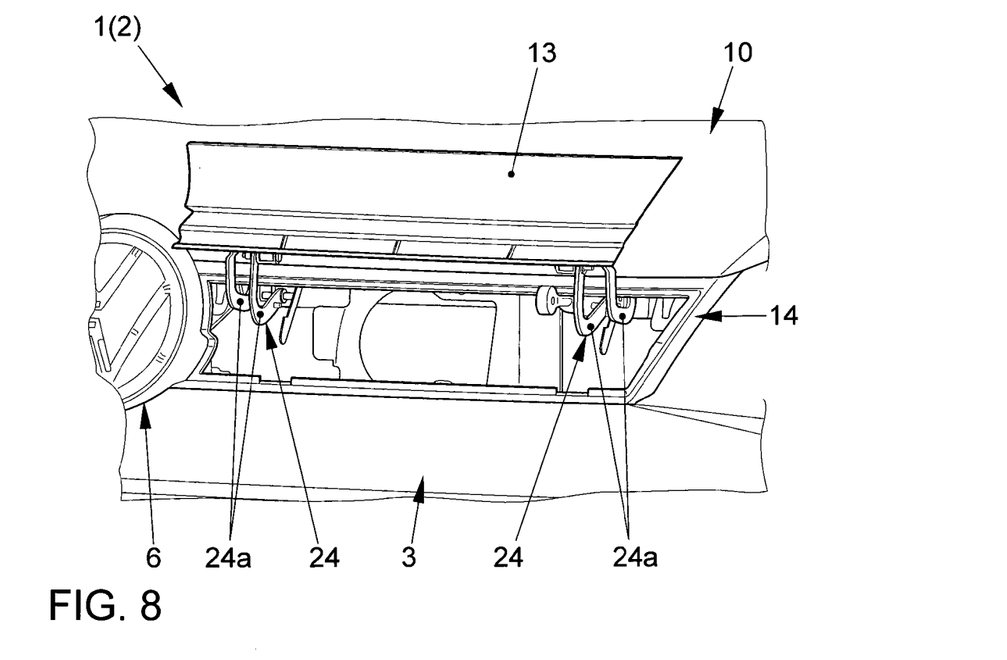
FIG. 8 shows a plan view of the radiator guard according to FIG. 7 with an open cover part.
Figure 9:
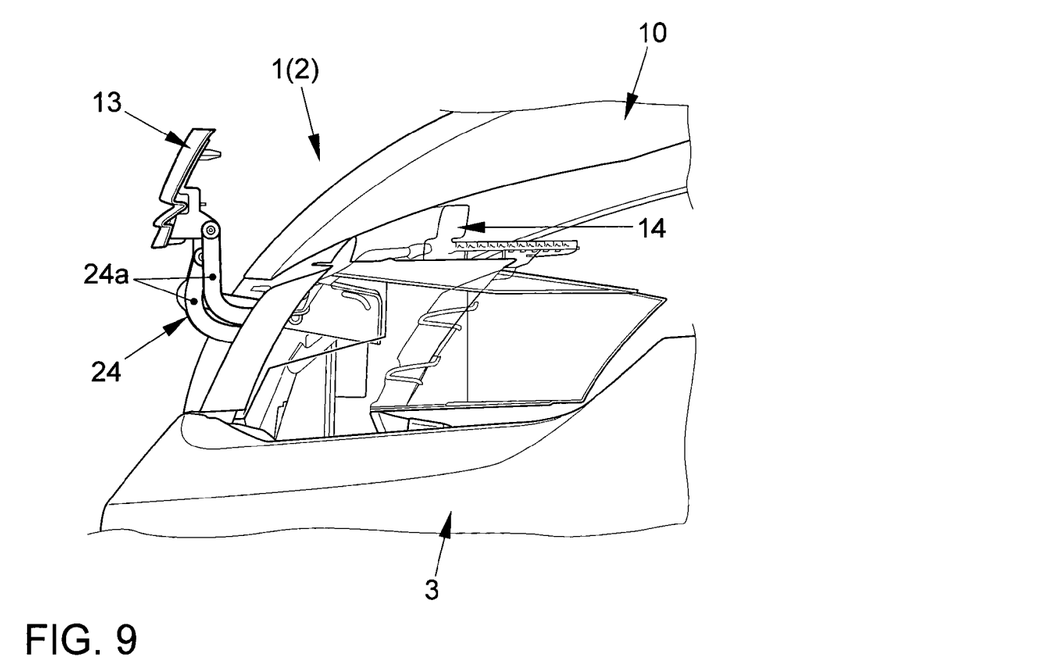
FIG. 9 shows a side view of the radiator guard according to FIG. 8.

According to FIG. 4, radiator guard 4, by way of example, has a frame-shaped support part 14, which is or can be attached to bumper 3 and/or other adjacent load-bearing parts of vehicle 2 or the vehicle body. Furthermore, according to FIGS. 3 and 5, a first cover part 15, fixedly arranged on support part 14, and a second cover part 13 adjustable relative to it are provided. Cover parts 13, 15 are arranged one behind the other when viewed in the transverse vehicle direction (Y-direction) and in the area of emblem 6, arranged centrally on radiator guard 4, with emblem holder 6a form a joint (not shown in the drawing), as a result of which said joint is very well concealed. Further, cover parts 13, 15 simultaneously form joints 16, 17, 18 to the adjacent parts, in the present case to bumper 3, to headlights 7, and to hood 10. This therefore enables a pre-assembled or pre-assemblable radiator guard module that can be attached easily and cost-effectively to vehicle 2.

The cover of radiator guard 4, substantially determining the design of radiator guard 4, in contrast to the prior art in which only one opening with a separate cover is provided in the design-determining cover, in the present case is formed divided centrally on radiator guard 4, whereby its cover part 13 is formed adjustable. Advantageously, in the case of the avoided negative design effect, a large clearance volume for charge plug 12 is realized (cf. particularly FIG. 3).

The adjustable second cover part 13 according to this design variant is formed relatively movable to first cover part 15 in the transverse vehicle direction (Y-direction). To this end, frame-shaped support part 14 has a first top and a second bottom guide rail 19, 20 in which second cover part 13 is guided movably by means of roller guide 21 or sliding guide from a first operating position, corresponding to the closed or normal position, to a second operating position, which corresponds to the open position, (FIGS. 3 to 6).

Guide rails 19, 20 in this case are arranged on support part 14 in such a way that second cover part 13 in the normal position, with first cover part 15, fixedly arranged on support part 14, forms an aligned side view of radiator guard 4, only interrupted by emblem holder 6a together with emblem 6. Guide rails 19, 20 run behind emblem holder 6a together with emblem 6, i.e., on the rear vehicle side of the same. Further, guide rails 19, 20 run at a slight angle to behind first cover part 15, so that second cover part 13 in the opened state or in the second operating state is located at least partially in a plane arranged at a slight angle to the plane of the first operating position. This guiding is facilitated particularly by the slightly curved contour of second cover part 13.

Second cover part 13 can be actuated or shifted/moved (not shown in drawing) by means of a mechanically, electromechanically, hydraulically, or pneumatically operated actuator and, for example, by remote control from passenger compartment 9. In the present case, the conditions for a manual actuation of second cover part 13 are created in that according to FIG. 6 on second cover part 13 a rib 23 is formed which is set in the direction of travel 22 of vehicle 2 and enables a manual actuation or movement of second cover part 13. The invention is not limited to this solution, however, but also covers, for example, a groove recessed in second cover part 13 or any other suitable device known per se for the proper manual handling of second cover part 13 (not shown in the drawing).

A further design variant of the radiator guard of the invention is illustrated in FIGS. 7 to 10, whereby functionally equivalent parts are labeled with the same reference characters as for the previous design variant, so that apart from the hereafter described differences, reference will be made to the above description for the explanation and understanding of said differences. Accordingly, this variant differs substantially from the previously described one in that a flap solution is selected instead of a sliding solution for shifting second cover part 13 from the normal position or closed position (FIG. 7) to the open position (FIGS. 8 to 10) and back.

In order to realize here as well a large clearance volume for charging plug 12 (cf. particularly FIG. 10), second cover part 13, now made flap-shaped, is hinged pivotably in the present case by a four-joint hinge 24 with curved articulated arms 24a on support part 14 or another suitable load-bearing part of vehicle 2, such as, for example, on a mounting frame (not shown in greater detail). Four-joint hinge 24 is formed in such a way that a parallelogram-type guiding of second cover part 13 is realized, which for its part enables its shifting from a plane corresponding to the first operating position or closed position of second cover part 13, to a plane parallel or virtually parallel thereto, which corresponds to the second operating position or open position of second cover part 13. Advantageously, in this regard, the visible side of second cover part 13 substantially retains its spatial orientation with respect to a viewer. This is advantageous particularly when the visible side of second cover part 13 has a distinctive or striking feature of radiator guard 4, such as, for example, a specific contour and/or an optionally different emblem (not shown in the drawing).

This design variant is not limited, however, to said four-joint hinge, but also covers any other hinge solutions known per se, for example, plain pivoting solutions, in which the spatial orientation of the visible side of second cover part 13 is not retained, or also flap solutions, which are combined advantageously with a sliding solution, in order, for example, to increase still further the clearance volume of charging plug 12 (not shown in the drawing).

Moreover, the invention is not limited to a sliding and/or flap solution of the previously described kind, but covers, for example, also a so-called drawer solution, in which second cover part 13 is taken so to speak vertically out of the plane of the normal position (first operating position or closed position) to the open position (second operating position) (not shown in the drawing). Instead of the arrangement of cover parts 13, 15 in the transverse vehicle direction (Y-direction), further cover parts 13, 15, which are arranged one above the other when viewed in the vertical vehicle direction (Z-direction) and of which at least one cover part 13 is formed adjustable within the meaning of the invention relative to the other cover parts 15, are also covered by the invention (not shown in the drawing).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

LIST OF REFERENCE CHARACTERS

1 Front end
2 Vehicle
3 Bumper
4 Radiator guard
5 Bars
6 Emblem
6a Emblem holder
7 Headlight
8 Fender
9 Passenger compartment
10 Hood
11 Charging socket
12 Charging plug
13 Cover part
14 Support part
15 Cover part
16 Joint
17 Joint
18 Joint
19 First guide rail
20 Second guide rail
21 Roller guide
22 Arrow indicating the direction of travel
23 Rib
24 Four-joint hinge
24a Articulated arm

What is claimed is:

1. A radiator guard for a vehicle, the radiator guard being arranged on a front end of the vehicle, the radiator guard comprising:
    at least one panel covering one or more units or devices arranged in the engine compartment of the vehicle;
    a moveable panel enabling access to at least one of the units or devices; and
    at least one hinge connected at a first end to the vehicle and connected at a second end to the moveable panel,
    wherein the moveable panel is pivotable from a first position to a second position,
    wherein the first position is different from the second position,
    wherein an outward facing surface of the moveable panel remains facing in a same direction in the first position and the second position,
    wherein the first end and the second end of the at least one hinge remain disposed in an area between the engine compartment and the moveable panel when the moveable panel is in the first position and in the second position and when pivoted from the first position to the second position, and wherein the second end of the at least one hinge is connected to the moveable panel on an inward side of the moveable panel that is opposite the outward facing surface.

2. The radiator guard according to claim 1, wherein the moveable panel is adjustable relative to the at least one panel.

3. The radiator guard according to claim 2, wherein the at least one panel and the moveable panel have one or more bars formed in a manner of a grille or radiator guard grille.

4. The radiator guard according to claim 2, wherein, in the second position, the moveable panel and the at least one panel are arranged one behind the other when viewed in a transverse vehicle direction or one above the other when viewed in a vertical vehicle direction.

5. The radiator guard according to claim 2, wherein the outward facing surface of the moveable panel forms an aligned visible side of the radiator guard if in the first position.

6. The radiator guard according to claim 2, wherein the second position is an open position.

7. The radiator guard according to claim 2, wherein the moveable panel is pivotable relative to the at least one panel.

8. The radiator guard according to claim 2, wherein the moveable panel covers a media connecting device arranged on a engine compartment side of the panel, the media connecting device being a charging socket for supplying an electrical storage unit with electrical current.

9. A motor vehicle, comprising a radiator guard according to claim 1.

10. The radiator guard of claim 1, wherein the moveable panel is disposed on a right side or a left side of the longitudinal midline of the vehicle.

11. The radiator guard of claim 1, wherein a plane of the outward facing surface of the moveable panel remains substantially perpendicular to a longitudinal direction of the vehicle throughout a pivoting from the first position to the second position.

12. The radiator guard according to claim 1, wherein the at least one hinge is formed as one-piece between the first end and the second end.

13. A connection guard for a vehicle, the connection guard comprising:
- a moveable panel on the outer surface of the vehicle covering a connection opening; and
- at least two hinges, each connected at a first end to the vehicle and each connected at a second end to the moveable panel, wherein the moveable panel is pivotable from a first position to a second position, wherein the first position is different from the second position,
- wherein an outward facing surface of the moveable panel remains facing in a same direction in the first position and the second position, and wherein the second end of each of the hinges are not equal distances from a longitudinal midline of the vehicle; and
- wherein the connection opening provides access to a charging socket for supplying an electrical storage unit with electrical current.

14. The connection guard of claim 13, wherein the moveable panel is disposed on a right side or a left side of the longitudinal midline of the vehicle.

15. The connection guard of claim 13, wherein a plane of the outward facing surface of the moveable panel remains substantially perpendicular to a longitudinal direction of the vehicle throughout a pivoting from the first position to the second position.

* * * * *